United States Patent
Barsotti et al.

[11] Patent Number: 5,837,353
[45] Date of Patent: Nov. 17, 1998

[54] LOW VOC REFINISH COATING COMPOSITION

[75] Inventors: Robert J. Barsotti, Franklinville, N.J.; Lee R. Harper, Media, Pa.

[73] Assignee: E. I. du Pont de Nemours and Company, Wilmington, Del.

[21] Appl. No.: 765,535

[22] PCT Filed: Jun. 16, 1995

[86] PCT No.: PCT/US95/07123

§ 371 Date: Jan. 7, 1997

§ 102(e) Date: Jan. 7, 1997

[87] PCT Pub. No.: WO96/01864

PCT Pub. Date: Jan. 25, 1996

[51] Int. Cl.[6] ............... B32B 27/06; B32B 27/08; B32B 27/38

[52] U.S. Cl. ............... 428/204; 428/203; 428/413; 428/423.1; 523/400; 525/107; 525/111; 525/117; 525/119; 525/207; 525/221; 525/453

[58] Field of Search ............... 428/203, 204, 428/206, 207, 413, 423.1; 525/107, 111, 309, 514, 123, 127, 117, 119, 207, 221, 453; 523/400

[56] References Cited

U.S. PATENT DOCUMENTS

| | | | |
|---|---|---|---|
| 4,550,154 | 10/1985 | Kordomenos | 528/73 |
| 4,732,791 | 3/1988 | Blackburn et al. | 427/407.1 |
| 4,749,743 | 6/1988 | Ambrose et al. | 525/123 |
| 5,162,482 | 11/1992 | Arduengo, III | 528/94 |
| 5,428,082 | 6/1995 | Gould et al. | 523/400 |
| 5,466,752 | 11/1995 | Barsotti et al. | 525/65 |
| 5,547,757 | 8/1996 | Swarup et al. | 428/413 |
| 5,582,922 | 12/1996 | Barsotti et al. | 428/500 |
| 5,602,274 | 2/1997 | Gould et al. | 360/126 |

FOREIGN PATENT DOCUMENTS

| | | |
|---|---|---|
| 0 257 512 A3 | 3/1988 | European Pat. Off. . |
| 05 598 131 A1 | 5/1994 | European Pat. Off. . |
| WO 94/11415 | 5/1994 | WIPO . |
| WO A 95 18166 | 7/1995 | WIPO . |

*Primary Examiner*—Vivian Chen
*Attorney, Agent, or Firm*—James A. Costello

[57] ABSTRACT

A coating composition based on low molecular weight anhydrides having pendant, non-cyclic anhydride moieties, hydroxy-functional epoxy resin, and active catalyst wherein the coating composition cures at ambient conditions.

6 Claims, No Drawings

LOW VOC REFINISH COATING COMPOSITION

BACKGROUND OF THE INVENTION

The present invention relates to a curable coating composition particularly useful as a top coat in multi-layered coating systems.

Base coat-clear coat systems have found wide acceptance in the past decade as automotive finishes. Continuing effort has been directed to such coatings systems to improve the overall appearance, the clarity of the top coat, and the resistance to deterioration. Further effort has been directed to the development of coating compositions having low volatile organic content (VOC) and which cure at ambient temperature.

Previous efforts at improving the etch resistance and durability of coatings had suggested the use of anhydride resins having pendant non-cyclic anhydride moieties in combination with resins that react with the polyanhydride resins to cure under curing conditions. However, a continuing need exists for coating formulations which can be sprayed at low VOC and which exhibit outstanding performance characteristics after application, and particularly resistance to environmental etching, and which cure at room temperature or ambient conditions.

EPA 598,131 discloses curable compositions that may contain two noncyclic acid anhydride groups, not 3 groups as employed herein to insure branching.

SUMMARY OF THE INVENTION

The present invention provides a sprayable coating composition which can be easily applied at high solids and exhibits outstanding appearance and durability after application and ease of maintenance.

Specifically, the instant invention provides a curable coating composition for curing at ambient conditions comprising organic solvent and binder comprising (a) an anhydride resin having a molecular weight of less than about 3000 that contains (1) a central moiety, and (2) on average, at least 3 pendant, non-cyclic anhydride moieties bonded to each central moiety;

(b) An oligomer or polymer having a molecular weight of 150 to 20,000 and having epoxy functionality of at least 2, at least a portion of which oligomer or polymer has at least one hydroxy functionality to enable curing at ambient conditions;

(c) an optional amount of an isocyanate crosslinking agent; and (d) A functional effective amount of at least one active catalyst, and wherein the ratio of equivalents of hydroxy to anhydride is at least 0.05 to 1.0.

DETAILED DESCRIPTION OF THE INVENTION

The compositions according to the present invention comprise anhydride resins having a (weight average) molecular weight of less than about 3000 and having a central moiety with more than one pendant, non-cyclic anhydride moiety bonded to each central moiety. This anhydride can suitably be used in the amount of 10 to 80 percent by weight of binder, preferably 35 to 60 percent. The anhydride is asymmetrical, and preferably contains a moiety represented by the following formula:

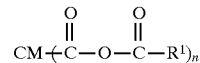

wherein (CM) is a central moiety, ($R^1$) is an organic moiety, and n is a number of pendant anhydride groups that averages greater than one.

The central moiety can be a simple organic moiety, such as an aliphatic, cycloaliphatic or aromatic moiety, with a plurality of anhydride groups bonded to it. Alternatively, it can contain a plurality of repeating units which are bonded to one or more pendant anhydride groups. Examples of suitable non-polymeric central moieties are those derived from multifunctional alcohols such as pentaerythritol, trimethylolpropane and neopentyl glycol. The multifunctional alcohols are reacted with cyclic, monomeric anhydride such as methyl hexahydrophthalic anhydride to give a multifunctional acid containing moiety. The resulting product is then reacted with ketene to form the linear pendant anhydride.

The central moiety is linked to more than one non-cyclic anhydride moiety, on average. It is preferably linked to at least about 2 non-cyclic anhydride groups on average and more preferably to at least about 3 non-cyclic anhydride groups on average. The anhydride equivalent weight (formula weight per anhydride group) is preferably at least about 200 and preferably no more than about 1000.

Each anhydride moiety is typically terminated by an organic group ($R^1$). This group is preferably aliphatic and more preferably alkyl. It preferably contains no more than about 6 carbon atoms, more preferably no more than about 4 carbon atoms, and most preferably methyl.

The oligomeric anhydride can optionally contain a polyvalent organic moiety (A) that is linked to a plurality of anhydride groups by a plurality of pendant linking groups (LG), as illustrated in the following formula:

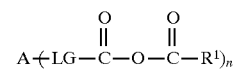

The liking group (LG) can contain, for example, ester linkages, alkylene groups, ether linkages, urethane linkages and combinations of those. The polyvalent organic group can contain, for example a polyvalent alkyl or aromatic group. The combination of the polyvalent organic moiety (A) and the linking groups (LG) forms the central moiety (CM) as previously described.

The central moiety can optionally contain other functional groups in addition to the pendant non-cyclic anhydride groups. For example, the central moiety may contain pendant acid groups, so that the anhydride is represented by the formula:

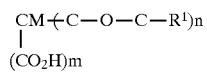

wherein m is the number of pendant acid groups and all others have the meaning previously given. The molar ratio of pendant non-cyclic anhydride groups to pendant acid groups in the oligomeric anhydride is preferably at least about 25:75, more preferably at least about 50:50, and more highly preferably at least about 75:25. Most preferably, the anhydride contains substantially no pendant acid groups. The central moiety can also contain minor quantities of cyclic anhydride moieties.

The molecular weight of the anhydride resin is an important feature of the present invention, and should be less than about 3000. At molecular weights of the oligomeric anhydride greater than 3000, it is difficult to attain a sprayable composition with a volatile organic content of less than about 4.0 pounds of organic solvent per gallon of curable compositions. The molecular weight of the anhydride resin is preferably about from 400 to 1,000, and the anhydride resin preferably has 3 to 4 pendant, non-cyclic anhydride moieties bonded to each central moiety.

The oligomeric epoxy component contains at least two epoxy groups and should have a molecular weight of less than about 1500.

Typical epoxy components which may contain a hydroxy functionality or (OH) group include, among others, sorbitol polyglycidyl ether, mannitol polyglycidyl ether, pentaerythritol polyglycidyl ether, glycerol polyglycidyl ether, low molecular weight epoxy resins such as epoxy resins of epichlorohydrin and bisphenol-A, and polyglycidyl ethers of isocyanurates, for example, "Denecol" EX301 from Nagase and DCE-358® sorbitol polyglycidyl ether from Dixie Chemical.

Optional additional epoxy components which typically do not contain significant hydroxy functionality include, among others, di- and polyglycidyl esters of polycarboxylic acids, and di- and polyglycidyl esters of acids, such as Araldite CY-184® from Ciba-Geigy, or XU-71950 from Dow Chemical are preferred since they form high quality finishes. Cycloaliphatic epoxies can also be used, such as ERL4221 from Union Carbide.

Alternatively or additionally, the present compositions may contain, a polymeric epoxy resin having a molecular weight of from about 1,000 to 20,000. The epoxy resin can comprise, in addition to epoxy-group-containing monomers, copolymerized monomers of alkyl methacrylates or alkyl acrylates or mixtures thereof, where the alkyl groups have 1–12 carbon atoms. Optionally, the acrylic polymer can contain other components such as styrene, alpha-methyl styrene, acrylonitrile, and/or methacrylonitrlle in amounts of about 0.1 to 50 percent by weight.

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate, decyl methacryate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the acrylate polymer are acrylamide, methacrylamido, and acrylo alkoxy silanes such as gamma methacryloyl propyl trimethoxy silane. The polymer can optionally contain hydroxy functional copolymerized monomers such as hydroxyethyl acrylate, hydroxypropyl acrylate, and hydroxyethyl methacrylate.

Suitably the epoxy component can be present in the composition in the amount of 20 to 90 percent, by weight of binder, preferably 40 to 65 percent. However, a better determinative measure of the amount of each of the main or reactive components of the binder (which "binder" generally includes components other than solvent or carrier and pigments) is the equivalents ratio. In the compositions according to the present invention, the ratio of equivalents of hydroxy to anyhydride is at least 0.05, preferably at least 0.1. In the absense of isocyanate, the range is 0.05 to 1.0. The range of the ratio of equivalents of hydroxy to the combination of anhydride and isocyanate, however, may suitably be about 0.05 to 1.5, preferably about 0.1 to 1.0, and most preferably about 0.3 to 0.8. The equivalents ratio of epoxy to anhydride is about 0.5 to 1.8, preferably about 0.7 to 1.4.

As mentioned earlier, the composition may optionally also contain an organic polyisocyanate crosslinking agent, for example in the amount of 0 to 25 percent by weight of binder, preferably 5 to 15 percent. Any of the conventional aromatic, aliphatic, or cycloaliphatic isocyanates; trifuctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis-cyclohexyl diisocyanate, tetramethylene xylene diisocyanate, ethyl ethylene diisocyanate, 2,3-dimethyl ethylene diisocyanate, 1-methyltrimethylene diisocyanate, 1,3-phenylene diisocyanate, 1,5-napthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like, Trimers of diisocyanates also can be used such as the trimer of hexamethylene diisocyanate which is sold under the tradename "Desmodur"® N-3390 and the trimer of isophorone diisocyanate. Trifunctional adducts of triols and diisocyanates may be used.

The present compositions contain a functional amount of at least one active catalyst. By functional amount is meant a quantity which will allow for curing at ambient conditions. Particularly beneficial in the present invention are tertiary amine catalysts such as triethylene diamine (1,4-diazabicyclo(2.2.2)octane), bis(2-dimethyl aminoethyl) ether and tetramethylethylenediamine. When the composition also comprises an isocyanate crosslinking agent, an additonal catalyst, for example, a dibutyl tin dilaurate or dibutyl tin diacetate may be included.

The total amount of catalyst is suitably used in the amount of 0.05 to 5 percent by weight of binder.

The coating compositions of the present invention are usually formulated into high solids coating systems dissolved in at least one solvent. The solvent is usually essentially all organic and comprises 10 to 70 percent, preferably 20 to 60 percent by weight of the composition. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions of the present invention can also contain conventional additives such as pigments, stabilizers, rheology control agents, surface tension reducing agents, flow agents, toughening agents and fillers. Such additional additives will of course, depend on the intended use of the coating composition. Filers, pigments, and other additives that would adversely effect the clarity of the cured coating will not be included if the composition is intended as a clear coating.

The compositions of the present invention usually have a volatile organic content of less than about 4.4 pounds of organic solvent per gallon of curable composition. The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions. The present coating compositions can be applied using conventional techniques such as wet-on-wet applications over solvent borne basecoats, or over dried waterborne basecoats. The ability to apply the present compositions by spraying techniques with the unusually low VOC content is surprising.

After application to a substrate, the present compositions are cured at ambient conditions (about 60° to 110° F., depending on the geographical location, usually 65° to 90° F.).

The performance characteristics of the final cured coating composition are excellent, providing a combination of excellent gloss and durability to abrasion, sunlight and acidic rain. At the same time, the compositions provide low volatile organic content and ease of handling.

The present invention is further illustrated by the following specific examples, in which parts and percentages are by weight unless otherwise indicated.

EXAMPLE 1

This example illustrates the synthesis of a tetra-functional half-acid ester. The following constituents were charged to a reaction vessel equipped with a heating mantle, reflux condenser, thermometer, nitrogen inlet, and stirrer:

|  | Parts by Weight |
|---|---|
| Portion 1 | |
| Pentaerythritol | 478.0 |
| Methyl hexahydrophthalic anhydride | 2250.0 |
| Triethylamine | 0.5 |
| Portion 2 | |
| Xylol (135–145° C.) | 2250.0 |
| Total | 4978.5 |

Portion 1 was charged into the reaction vessel, heated to 180° C. under a nitrogen blanket and held for 30 minutes. After the hold period, the reaction mixture was cooled land Portion 2 added.

EXAMPLE 2

This example illustrates the preparation of a linear pendant anhydride (hereafter referred to as LPA). The solution prepared in example 1 was charged into a 5 liter flask equipped with a stirrer and a gas inlet tube. The gas inlet tube was attached to a ketene generator similar to the one described by Williams et al in the Journal of Organic Chemistry 5, 112, 1940. Ketene is bubbled through the solution until all of the acid groups have been converted to anhydride groups. Reaction progress is monitored via FTIR. Solvent was then removed under vacuum to give a linear pendant anhydride with the following characteristics:

Percent weight solids: 78.0

Anhydride eq. wt.: 329±4 (on solution basis)

Acid eq. wt.: 6176±1323 (on solution basis)

EXAMPLE 3

This example illustrates the preparation of a polymeric epoxy resin containg hydroxy functionality. A skewed structure epoxy polymer was synthesized consisting of trimethyl silane protected hydroxy ethyl methacrylate/isobutyl methacrylate/glycidyl methacrylate in the mole ratio of 1/5/5. The following ingredients were dried over molecular sieves. The materials were charged to a clean, dry reactor.

| Component | Parts by Weight |
|---|---|
| Tetrahydrofuran (anhydrous) | 714.428 |
| 1-(2-trimethylsiloxy) ethoxy-1-trimethylsiloxy-2-methyl propene | 80.143 |
| Glycidyl methacrylate monomer | 154.143 |
| Iso-butyl methacrylate | 51.285 |

The above solution was cooled to −5 degrees C. Cooling of the reaction mixture was stopped for the start of the exothermic reaction. The following solution was added over 30 minutes, stopping when the reaction begins to exotherm. Cooling was resumed when the exotherm raised the temperature to 10–15 degrees C. The next step was started when the charged monomer was 75% converted.

| Component | Parts by Weight |
|---|---|
| Tetrabutyl ammonium chlorobenzoate | 0.286 |
| Tetrahydrofuran | 0.571 |

The addition of both of the following solutions was started simultaneously. Solution 1 was added over 40 minutes and solution 2 was added over 30 minutes.

|  | Parts by Weight |
|---|---|
| Component (Solution 1) | |
| Tetrahydrofuran | 2.143 |
| Tetrabutyl ammonium chlorobenzoate | 0.286 |
| Component (Solution 2) | |
| Glycidyl methacrylate | 51.286 |
| Iso-butyl methacrylate | 154.143 |

Once complete conversion of the monomers occurred, the following ingredients were added in the order listed, distilling off 428.571 parts of excess solvent to give a yield of 800.0 parts of a polymer solution at 61% solids.

| Component | Parts by Weight |
|---|---|
| Methanol | 13.714 |
| Glacial acetic acid | 6.143 |

The intermediate was concentrated as follows:

| Component | Parts by Weight |
|---|---|
| above intermediate | 800 |
| butyl acetate | 189.8 |
| glacial acetic acid | 4.25 |

Finally, 313 parts of this reaction product was distilled out for a resulting solution of 65% solids.

EXAMPLE 4

This example illustrates an ambient cured LPA/sorbitol ether epoxy composition system according to the present invention. Two separate parts or packages were formed and the parts mixed in a pot to obtain an ambient curing coating for application to a substrate.

| Component | Parts by Weight |
|---|---|
| Part I | |
| LYA (Example 2 above) | 49.0 |
| 15% triethylene diamine/PM acetate | 8.84 |
| 5% BYK-301 ® (silicone)/PM acetate | 0.66 |
| Butyl acetate | 12.2 |
| Part II | |
| DCE-358 ® sorbitol ether epoxy from Dixie Chem. | 29.3 |

PM acetate is propylene glycol monomethyl ether. Parts I and II were combined in the amounts shown (total 100 parts), applied as a film to a substrate, and cured at ambient conditions. The coating showed good appearance, cure, and film properties.

EXAMPLE 5

This example illustrates the preparation of a coating composition comprising an LPA/sorbitol ether epoxy and diglycidyl ester blend. Two separate parts or packages were formed and the parts mixed in a pot to obtain an ambient curing coating for application to a substrate.

| Component | Parts by Weight |
|---|---|
| Part I | |
| LPA | 56.64 |
| 5% BYK ®-301/PM acetate | 0.7 |
| 25% Niax ® A-99 ® (tertiary amine from Union Carbide) in PM acetate | 8.69 |
| PM acetate | 2.7 |
| Part II | |
| DCE-358 ® sorbital ether epoxy from Dixie Chem. | 17.12 |
| XU-71950 ® diglycidyl ester from Dow | 14.15 |

Parts I and II were combined in the amounts shown (total 100 parts), applied as a film to a substrate, and cured at ambient conditions. The coating showed good appearance, cure, and film properties.

EXAMPLE 6

This example illustrates an coating composition comprising LPA/diglycidyl ester polymeric epoxy blend. Two separate parts or packages were formed as follows, for subsequent mixture in a pot to obtain an ambient curing coating composition.

| Component | Parts by Weight |
|---|---|
| Part I | |
| LPA (Example 2 above) | 45.3 |
| 5% BYK ®-301 in PM acetate | 0.56 |
| 15% triethylene diamine in PM acetate | 9.06 |
| Part II | |
| XU-71950 | 11.31 |
| GMA Epoxy (Example 3 above) | 33.77 |

Parts I and II were combined in the amounts shown (total 100 parts), applied as a film to a substrate, and cured at ambient conditions. The coating showed good appearance, cure, and film properties.

EXAMPLE 7

This example illustrates the preparation of an ambient curing coating composition comprising an LPA/sorbitol ether epoxy/isocyanate blend. Three separate parts or packages were formed and the parts were mixed in a pot to obtain an ambient curing coating for application to a substrate.

| Component | Parts by Weight |
|---|---|
| Part I | |
| LPA (Example 2 above) | 47.44 |
| 15% triethylene diamine in PM acetate | 12.85 |
| 1% Dibutyl tin dilaurate in MEK (methyl ethyl ketone) | 1.39 |
| 1% BYK ®-301 in PM acetate | 3.53 |
| Part II | |
| DCE-358 sorbitol ether epoxy from Dixie Chem. | 28.37 |
| Part III | |
| Tolonate HDT-isocyanate from Rhone Poulenc | 6.42 |

Parts I, II and III were combined in the amounts shown (total 100 parts), applied as a film to a substrate, and cured at ambient conditions. The coating showed good appearance, cure, and film properties.

EXAMPLES 8–10

These examples illustrate a refinish clearcoat according to the present invention comprising a blend of LPA with sorbitol glycidyl ether and diglycidyl cyclohexane dicarboxylate and epoxy resin and HMDI isocyanate trimer.

| | Parts by Weight | | |
|---|---|---|---|
| | 8 | 9 | 10 |
| Part 1 | | | |
| Linear Pendant Anhydride (Example 2) | 106.37 | 53.08 | 105.35 |
| BYK ® 306 flow additive | 0.40 | 0.40 | 0.40 |
| PM Acetate | 5.31 | 3.55 | 5.67 |
| Tinuvin ® 1130 from Ciba | 4.65 | 4.47 | 4.64 |
| Tinuvin ® 123 from Ciba | 3.10 | 2.98 | 3.10 |
| Part 2 | | | |
| DCE-358 ® epoxy from Dixie | 33.72 | 0.00 | 26.76 |
| Tolonate HDT ® | 0.00 | 0.00 | 13.38 |
| Polymeric epoxy as in Ex. 3 except a 1/8/8 ratio of HEMA/IBMA/GMA | 0.00 | 70.58 | 0.00 |
| XU-71950 ® epoxy from Dow | 27.87 | 47.05 | 22.12 |
| Part 3 | | | |
| 25% triethylene diamine in PM acetate | 18.58 | 17.89 | 18.57 |
| Total | 200.00 | 200.00 | 200.00 |

The compositions prepared above were tested as films drawn down on glass or on glass previously coated with a blue Chromabase® (from DuPont) solventborne basecoat. The Properties were as follows:

| Appearance | OK | OK | OK |
|---|---|---|---|
| Dry time (in hours) | | | |
| Bk Dry Time #1 (free from dust) | 1.0 | 0.50 | 125 |
| Bk Dry Time #2 (dry to touch) | 23 | 7.375 | 22 |
| Bk Dry Time #3 | 22.5 | 22.5 | 22.5 |

-continued

| Appearance | OK | OK | OK |
|---|---|---|---|
| (hard dry) | | | |
| Bk Dry Time #4 | 23+ | 23+ | 23+ |
| (through dry) | | | |
| Persoz 5 day/7 day (hardness) | | | |
| on glass | 92/143 | 15/45 | 67/93 |
| on chromabase | 41/51 | 37/52 | 38/48 |
| Tukon 7 Day (hardness) | | | |
| on glass | 4.80 | 1.10 | 2.13 |
| on chromabase | 1.60 | 1.12 | 1.40 |
| MEK Double Rubs (solvent resistance) | | | |
| on glass | 200+ | 200+ | 200+ |
| on Chromabase ® basecoat | 200+ | 30 | 200+ |

Various modifications, alterations, additions, or substitutions of the components of the composition of this invention will be apparent to those skilled in the art without departing from the scope and spirit of this invention. This invention is not limited to the illustrative embodiments set forth herein, but rather the invention is defined by the following claims.

What is claimed is:

1. A coating composition comprising, by weight of composition, 10 to 70 percent organic solvent and 30 to 90 percent of a binder comprising:
    (a) an anhydride resin having a weight average molecular weight of less than about 3000 that contains
        (1) a central moiety, and
        (2) on average, at least 3 pendant, non-cyclic anhydride moieties bonded to each central moiety;
    (b) an oligomer or polymer crosslinker having a weight average molecular weight of about 150 to 20,000 and having epoxy functionality of at least 2, at least a portion of which crosslinker has at least one hydroxy functionality; and
    (c) a functional amount of at least one active catalyst,
    wherein the ratio of equivalents of hydroxy to anhydride is at least about 0.05 and the ratio of equivalents of epoxy to anhydride is 0.5 to 1.8 and wherein said coating composition cures under ambient conditions.

2. The composition of claim 1 further comprising an isocyanate crosslinking agent wherein the ratio of equivalents of hydroxy to the combination of anhydride and isocyanate is 0.05 to −1.5.

3. A curable coating composition of claim 1 applied to a substrate.

4. A coated substrate of claim 3 wherein the substrate is coated with a pigmented base coat.

5. A coated substrate of claim 4 wherein the applied curable composition is substantially free from pigment.

6. A coated substrate of claim 4 wherein the base coat is a water-based coating composition.

* * * * *

UNITED STATES PATENT AND TRADEMARK OFFICE
CERTIFICATE OF CORRECTION

PATENT NO. : 5,837,353
DATED : November 17, 1998
INVENTOR(S) : Robert J. Barsotti, Lee R. Harper It is certified that error appears in the above-identified patent and that said Letters Patent is hereby corrected as shown below:

Claim 2, column 10, line 18, please delete "0.05 to –1.5" and insert therfor -- 0.05 to 1.5 --.

Signed and Sealed this

Twelfth Day of October, 1999

Q. TODD DICKINSON

Attest:

Attesting Officer

Acting Commissioner of Patents and Trademarks